March 9, 1943.  W. C. HEATH  2,313,067

ELECTRIC FORMING APPARATUS

Filed May 4, 1942

William C. Heath
INVENTOR.

BY
ATTORNEY.

Patented Mar. 9, 1943

2,313,067

UNITED STATES PATENT OFFICE 2,313,067

ELECTRIC FORMING APPARATUS

William C. Heath, Shorewood, Wis., assignor to A. O. Smith Corporation, Milwaukee, Wis., a corporation of New York Application May 4, 1942, Serial No. 441,623

13 Claims. (Cl. 219—3)

This invention relates to electric forming apparatus and more particularly to apparatus for progressively heating and forming a rotating tube in the manufacture of end closures thereon and in the reducing of the diameter of tubes.

The invention has been applied to the forging of end closures in the manufacture of bombs from cylindrical tubes by a process employing the circumferential flow of current through the stock being formed between spaced segmental electrodes which at the same time constitute the forming dies.

The object of the invention is to provide regions of different voltage for the purpose of controlling the heating of the tube differently in different regions of forming.

Another object is to eliminate the possibility of scoring of the finished article at the circumferential dividing line between two sections of electrode dies.

The invention is illustrated in the accompanying drawing in which.

Figure 1:
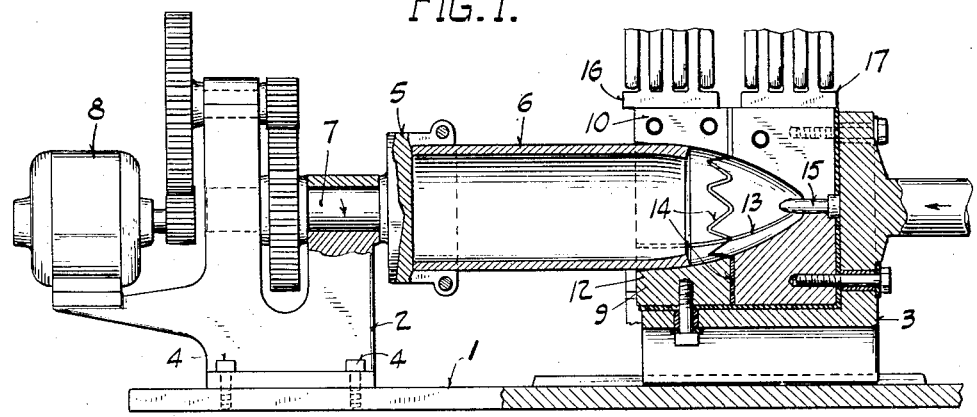
Figure 1 is a side elevation of the apparatus partly in section.
Figure 2:
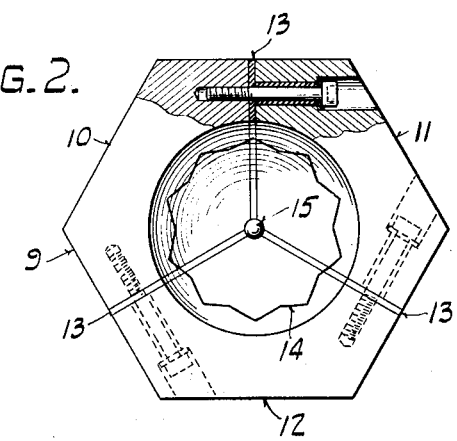
Fig. 2 is an enlarged end view of the dies partly in section.
Figure 3:
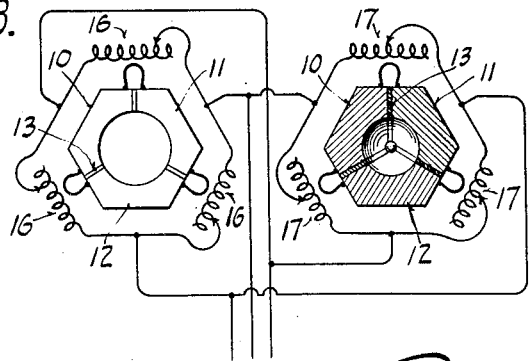
Fig. 3 is a schematic showing of the electric circuit employed.

The apparatus to which the invention has been applied generally comprises a base 1 with two upstanding supports 2 and 3 at opposite ends thereof.

The support 3 is longitudinally slidable on base 1 and disposed to reciprocate under hydraulic or other suitable power means toward and away from the support 2 which is secured to the base by screws 4. The support 2 carries a chuck 5 for receiving the end of a tube or pipe 6 to be formed, the chuck being mounted upon a rotary shaft 7 driven through suitable gearing by a motor 8.

The support 3 carries the forming dies 9 which are engaged by the free end of the tube 6 to form the latter. The dies 9 illustrated in the drawing provide a die recess having the general shape of the nose of a bomb and are adapted to form the end of tube 6 into such shape, as the tube is pushed into the dies. The dies, of course, may have any desired symmetrical shape depending upon the product being formed and the apparatus may be used in the forming of bells, flanges and other shapes.

The dies 9 are separated into a plurality of segments, preferably three, 10, 11 and 12. The segments are separated on longitudinal lines by inserts of electrically resistant insulation 13 capable of withstanding high temperatures. The insulation 13 serves to provide a predetermined gap between the dies.

The die segments 10, 11 and 12 are each divided transversely into two or more parts separated by insulation 14 similar to insulation 13. Each of the die segments illustrated in the drawing have two parts, the forward part at the open larger end of the die and the rear part at the closed smaller end of the die. An insulating plug 15 separates the latter at the tip of the nose and serves to provide a central opening in the nose of the bomb as tube 6 is upset against it.

The forward and rear parts of the die segments are separated on a wavy or serrated line or on a plane cutting the axis at an angle to the perpendicular to protect the insulation 14 and prevent scoring of the article being formed.

The forward parts of the die segments are connected to the respective leads of a three-phase source of electrical energy by means of transformers 16 and the rear parts of the die segments are similarly connected to the respective leads of the same or another three phase source of electrical energy by means of transformers 17. The transformers 16 and 17 are constructed to supply electric energy for heating tube 6 at variably different potentials and are preferably connected to the same primary source of electricity. An additional set of transformers will be used for each additional division of the dies.

In operation the die segments 10, 11 and 12 constitute electrodes for conducting a heating current of electricity to the work piece tube 6. As tube 6 first enters the dies 9 and the end of the tube contacts the inner die surface the heating current starts to flow through the tube wall circumferentially across the gap between the segments 10, 11 and 12 beneath the insulation 13. The tube 6 first contacts the forward parts of the die segments and the tube is rotated fairly rapidly to heat a circumferential band in contact with the dies. Instead of rotating the tube 6 it is possible to rotate the dies 9 provided suitable changes are made to supply the current thereto.

As this band of tube 6 becomes heated it softens and the advancing pressure on the far end of the tube forces the former farther into the dies 9 thereby causing the softened end of the tube to gradually follow the contour of the dies and to upset in thickness. The operation is completed when the tube end is contracted by the rear parts of the die segments upon plug 15 and thickened to the desired amount.

In practice, heretofore, where each die segment was constructed of a single piece as set forth in the co-pending application of W. F. Heineman, for Electric forging apparatus, Serial No. 391,234, filed May 1, 1941, and assigned to a common assignee herewith, it was discovered that the current had some tendency to flow longitudinally along the dies toward the rear and to overheat or unduly soften the metal of the tube at the tip of the nose. This resulted in excessive thickening of the metal at the tip of the nose. The metal of the tube 6 is primarily heated and softened as it first comes into contact with the dies, and it is unnecessary to apply as great a heating current at the rear end of the die.

The present invention provides more than one stage of heating by applying different voltages to the respective forward parts and rear parts of the die segments. By its use a greater voltage is preferably applied to the forward parts than is applied to the rear parts, so that less additional heating of the metal will result as the metal of the tube progressively moves into the die.

The present invention makes it possible to apply greater heating current to the tube where it first contacts with the die without danger of finally overheating or melting the metal as it moves farther into the die. This directly results in faster operations and the tube 6 can be moved into the die and formed to final shapes with less power and at greater speed than heretofore.

The invention is also applicable to controlling the shape obtained in a given instance by control of the amount of softening in any region. It is essentially, however, that sufficient stiffness be retained in the article to obtain the proper pressure contact between the article and the dies in all regions.

The invetnion may have various embodiments within the scope of the accompanying claims.

I claim:

1. In an apparatus for symmetrically forming circular articles in which the article is pressed against dies co-axial therewith and rotated relative thereto, and said dies are formed in spaced segments constituting electrodes to supply a heating current to the article in the areas being formed, a plurality of sets of segmental dies, and means to supply heating current of a different voltage to each set of dies.

2. In an apparatus for symmetrically forming cylindrical articles in which the work piece is forced endwise against dies co-axial therewith and rotated relative thereto, and said dies are formed in circumferentially spaced segments constituting electrodes to supply a heating current to the work piece in the areas being formed, a plurality of sets of segmental dies disposed to successively engage parts of the work piece, and means to supply heating current of a different voltage to each set of dies.

3. In an apparatus for symmetrically forming tubular articles in which the tube is forced endwise against dies co-axial therewith and rotated relative thereto, and said dies are formed in circumferentially spaced segments constituting electrodes to supply a heating current to the article in the areas being formed, a plurality of sets of segmental dies disposed to successively engage parts of the article, and means to supply heating current separately to each set of dies, the current supplied to the set of dies first engaged by the article being of higher voltage than that supplied to another set of dies.

4. In an apparatus for symmetrically forming tubular articles in which the tube is forced endwise against dies co-axial therewith and rotated relative thereto, and said dies are formed in spaced segments constituting electrodes to supply a heating current to the article in the areas being formed, a plurality of sets of segmental dies insulated from one another and disposed to successively engage parts of the article, and means to supply separate heating currents to the several sets of dies.

5. In an apparatus for symmetrically forming cylindrical articles in which the work piece is forced endwise against dies co-axial therewith and rotated relative thereto, and said dies are formed in circumferentially spaced segments constituting electrodes to supply a heating current to the work piece in the areas being formed, a plurality of sets of segmental dies insulated from one another and disposed to successively engage parts of the work piece, and means to supply separate heating currents to the several sets of dies, said sets of segmental dies being axially separated on an irregular line to provide longitudinally extending tongues on each set extending into complemental recesses in the other set to support the work piece and prevent scoring of the same.

6. In an apparatus for symmetrically forming cylindrical articles in which the work piece is forced endwise against dies co-axial therewith and rotated relative thereto, and said dies are formed in circumferentially spaced segments constituting electrodes to supply a heating current to the work piece in the areas being formed, a plurality of sets of segmental dies insulated from one another and disposed to successively engage parts of the work piece, and means to supply separate heating currents to the several sets of dies, said sets of segmental dies being longitudinally separated on a serrated circumferential line to provide continuous support for the work piece by the dies and prevent scoring of the work piece.

7. In an apparatus for symmetrically forming cylindrical articles in which the work piece is formed endwise against dies co-axial therewith and rotated relative thereto, and said dies are formed in circumferentially spaced segments constituting electrodes to supply a heating current to the work piece in the areas being formed, a plurality of sets of segmental dies disposed to successively engage parts of the work piece, and means to supply heating current separately to each set of dies, the current supplied to the set of dies first engaged by the work piece being of a higher voltage than that supplied to another set of dies, said sets of segmental dies being longitudinally separated on a serrated circumferential line to provide continuous support for the work piece by the dies and prevent scoring of the work piece.

8. In an apparatus for symmetrically forming circular articles in which the article is pressed against dies co-axial therewith and rotated relative thereto, and said dies are formed in circumferentially spaced segments constituting electrodes to supply a heating current to the article in the areas being formed, a plurality of sets of segmental dies separated longitudinally and having means extending longitudinally across the gap therebetween to provide continuous support for the article and prevent scoring the same.

9. In an apparatus for symmetrically forming circular articles in which the article is pressed against dies co-axial therewith and rotated relative thereto, and said dies are formed circumferentially spaced segments constituting electrodes to supply a heating current to the article in the areas being formed, a plurality of sets of segmental dies separated longitudinally and having means extending longitudinally across the gap therebetween to provide continuous support for the article and prevent scoring of the same, and means to supply separate heating currents to the several sets of dies.

10. In an apparatus for symmetrically forming circular articles in which the article is pressed against dies co-axial therewith and rotated relative thereto, and said dies are formed in spaced segments constituting electrodes to supply a heating current to the article in the areas being formed, a plurality of sets of segmental dies to engage the article successively, and means to supply separate heating currents to the several sets of dies.

11. In an apparatus for symmetrically forming circular articles in which the article is pressed against dies co-axial therewith and rotated relative thereto, and said dies are formed in circumferentially spaced segments constituting electrodes to supply a heating current to the article in the areas being formed, a plurality of sets of segmental dies separated on a transverse plane at an angle to a plane perpendicular to the axis of the dies to engage the article successively, and means to supply separate heating currents to the several sets of dies.

12. In an electric forming apparatus, a plurality of die segments defining a die cavity for receiving and forming an article, means to pass a heating current through the portion of the article contacting with said segments as the article and die are rotated relative to one another, and means to control the application of heating current to the article independently in different longitudinal regions of the die.

13. In an electric heating apparatus, a plurality of sets of circumferentially spaced electrode segments having radially opposed contacting surfaces for engaging a relatively rotating article to be heated, and means to apply heating current of different potential to the several sets of electrodes to control the application of heating current to the article independently in different regions thereof.

WILLIAM C. HEATH.